Patented May 24, 1938

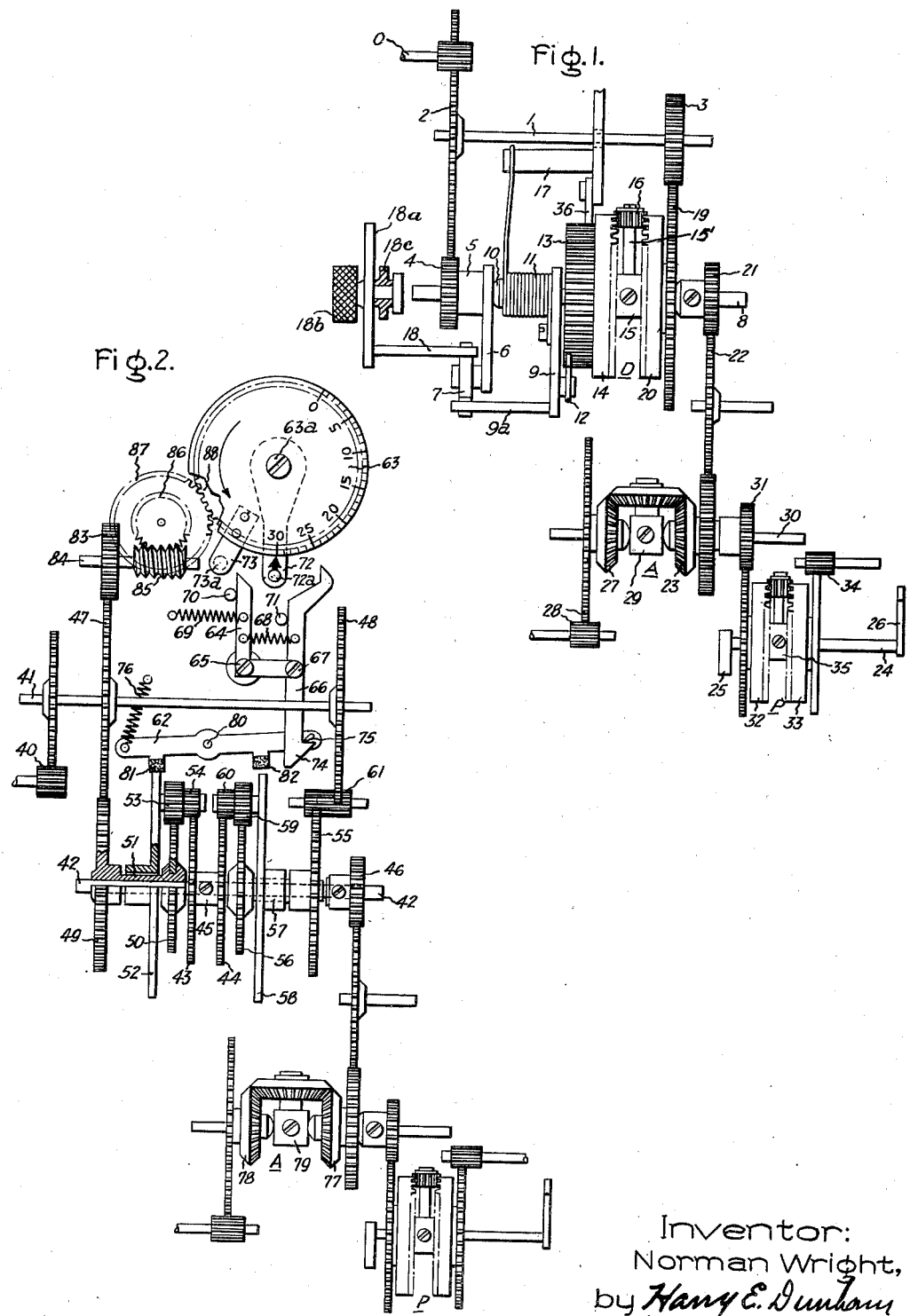

2,118,691

UNITED STATES PATENT OFFICE 2,118,691

PREPAYMENT METER

Norman Wright, Sale, England, assignor to General Electric Company, a corporation of New York Application March 16, 1936, Serial No. 69,227
In Great Britain March 25, 1935

9 Claims. (Cl. 194—11)

The present invention relates to prepayment meters for electricity, gas and the like commodities of the kind employed for collecting a fixed charge either alone or together with a charge in proportion to the quantity of the commodity consumed.

Prepayment meters of the kind referred to are provided with a mechanism usually called a meter differential which has two operable members. One of said members, herein referred to as the "coin side", is operated upon by the coin mechanism on the rotation thereof after the insertion of a coin into the coin box, to move the said operable member by an amount proportional to the value of the coin in the "on" direction to operate a commodity controlling mechanism, which allows a supply of the commodity to be obtained. The other operable member, herein referred to as the "commodity side", may be moved in the "off" direction partly by the meter rotor according to the consumption of the commodity and partly by a time element or wholly by a time element such as a synchronous motor, clock mechanism or other constant speed device at an average rate corresponding to the fixed charge or rent to be paid over the predetermined period. When the consumption metering element is absent and the consumer can consume as much of the commodity as he desires over a predetermined period, the meter is called a "fixed charge collector". When both the time element and the consumption metering element are present, the meter is known as a "two part prepayment meter."

It will be understood that the meter differential may take the form of an epicyclic differential mechanism, or it may be of the well known "catch up" mechanism type, or any other suitable mechanism.

It is an object of the present invention to provide an easily operable mechanism by which the fixed charge collected by the operation of the synchronous motor, clock mechanism, or other constant speed device, can be easily and readily varied. Other and further objects and advantages will become apparent as the description proceeds.

According to the present invention in its preferred form, when carried out in a prepayment meter of the kind specified, the mechanism between the synchronous motor, clock mechanism or other constant speed device and the commodity side of the meter differential includes two trains of gears, one or the other of which is continuously in operation to transmit the movement of the constant speed device to the commodity side of the meter differential, and a device adapted to render effective additionally or alternatively to the train of gears at the time in operation, the other gear train in a periodic manner, but for adjustable fractions of the periodic time and means whereby the said fractions of the periodic time can be easily varied.

In one method of carrying the invention into effect the same train of gears is constantly in gear between the constant speed mechanism and the commodity side of the meter differential and a second train of gears is brought into operation in addition to the train of gears constantly in gear in a periodic manner and for adjustable fractions of the periodic time between the constant speed mechanism and the meter differential. The effects of the two sets of gears during the periods in which they are both operative are summated or differentiated by means of an auxiliary differential mechanism, the resultant effect being a measure of the fixed charge to be collected.

In an alternative method of carrying the invention into effect two trains of gears are connected between the constant speed mechanism and the commodity side of the meter differential and are adapted to be brought alternately into operation so that one gear train is brought into operation in a periodic manner and remains in operation for adjustable fractions of the periodic time after which the other gear train is brought into operation. The two gear trains in this instance may work in the same or opposite directions. The sum or the difference between the effects of the two gear trains is a measure of the fixed charge to be collected.

The invention will be better understood from the following description taken in conjunction with the accompanying drawing which shows two embodiments of the invention as applied to an electricity two-part prepayment meter, and given by way of example only, and those features of the invention which are believed to be novel and patentable will be pointed out in the claims appended hereto.

In the drawing, Figure 1 shows diagrammatically a practical form of the first method of carrying the invention into practice hereinbefore described, and Figure 2 shows diagrammatically a practical form of the second method of carrying the invention into practice hereinbefore described.

Referring firstly to Figure 1, the shaft 0 of a constant speed mechanism, such as a synchronous motor, is suitably geared to a shaft 1 having secured thereto two gear wheels 2, 3, one of which 3 is geared through a gear wheel 19 to a sun wheel 20 of a differential mechanism D herein referred to as the auxiliary differential. The wheel 19 is integral with the sun wheel 20, which is loosely mounted on a shaft 8. The other gear wheel 2 is adapted to be coupled intermittently to the second sun wheel 14 of the auxiliary differential D by a suitable mechanism.

Such mechanism may, e. g., comprise an arm 6 herein referred to as the driving arm integral with a sleeve 5 and wheel 4 loosely mounted on shaft 8 and driven through the wheels 2 and 4 by the constant speed mechanism. A ratchet wheel 13 integral with the sun wheel 14 of the auxiliary differential D is secured to a sleeve 10 which is also loosely mounted on the shaft 8. Loosely mounted on the sleeve 10 is a driven arm 9 which carries a projecting pin 9a and a spring-pressed pawl 12. The arm 9 is spring pressed by a spring 11 so as to rest against a stop 17 secured to the meter frame. This pawl 12, engages with the teeth of the ratchet wheel 13. The arm 6 carries at its end a spring controlled driving pawl 7 which is adapted to engage the pin 9a projecting from the arm 9. As the wheel 4 is rotated the driving arm 6 carries forward with it the driven arm 9, causing it to rotate the ratchet wheel 13 since the pawl 12 which is carried thereby engages with the ratchet wheel 13 and causes the sun wheel 14, with which the wheel 13 is integral, to rotate. The movements of the two sun wheels 14, 20 of the auxiliary differential are added or subtracted in the well known manner by the planetary wheel 16 mounted on the cage 15 thereof which is secured to the shaft 8. The cage 15 provides a support for the gear 16 at the end of the radial spindle 15′, in the cage 15, and it is apparent that the support is movable transversely with respect to the axis of the gear 16, which meshes with the gears 14 and 20.

A rotatable circular disc 18a, herein referred to as the locating disc is provided with a central knob 18b by which it may be rotated and is mounted co-axially with the shaft 8 carrying the driving arm 6. The circular disc 18a is so mounted as to have an adjustable angular position which is retained until the adjustment is manually altered. Any suitable mounting arrangement may be employed such as a bearing 18c which is frictionally engaged by the disc 18a. The disc 18a carries a horizontally projecting trip pin represented at 18 which projects into the path of the driving pawl 7 so as to come into contact with the tail thereof and cause the pawl to be tripped from the pin 9a on the arm 9 whereupon on release this arm under control of spring 11 returns to the stop 17 and remains there until picked up again by the driving arm 6 during the next revolution thereof. As the arm 9 returns to the stop 17 the pawl 12 which it carries rides over the teeth of the associated ratchet wheel 13 which is prevented from rotating backwards by means of a stationary ratchet pawl 36 engaging with the teeth.

It will be observed that by varying the position of the pin 18 carried by the locating disc 18a by rotating said disc, the amount of movement given to the sun wheel 14 of the auxiliary differential D may be varied and hence the locating disc may be marked in a suitable manner to indicate various fixed charges, corresponding to the movements of the planetary cage 15 due to the sum or difference of the movements of the two sun wheels 14, 20.

The shaft 8 carries secured thereto a gear wheel 21 which is geared through wheel 22 to one sun wheel 23 constituting the fixed charge member of a second differential A, herein referred to as the summation differential. The other sun wheel 27 constituting a consumption member of the summation differential A is geared to the meter rotor (not shown) through gearing 28. It will be understood that the purpose of the summation differential is to sum up angular movements representing the fixed charge and the charge proportional to electrical consumption. The two sun wheels 23 and 27 are loosely mounted on the shaft 30 to which is secured the planetary wheel cage 29, and has also secured thereto a gear wheel 31. This latter wheel gears with the meter side 32 of the meter differential P, the coin side 33 of which is geared to the coin receiver mechanism (not shown) through wheel 34. It will be observed that the planetary cage 29 transmits the resultant of the motion of the two sun wheels 23, 27 to the commodity side 32 of the meter differential P in the well known manner. The planetary cage 35 of the meter differential is secured to a shaft 24 which has secured thereto a cam device 25 for operating the supply switch in the well known manner and the usual pointer 26 to indicate the coins unused.

In operation the wheels 4 and 19 are continuously rotated by the synchronous motor through the wheels 2 and 3. Since the wheel 19 is integral with the sun wheel 20 this latter wheel is continuously rotated, and the rate of rotation is adjusted and suitably chosen to represent a definite amount of fixed charge to be collected over an accounting period. This amount of fixed charge may then be increased by adding to the movement of the sun wheel 20 a movement of the sun wheel 14. For this purpose the sun wheels 14 and 20 will be arranged to rotate in the same direction. Alternatively, the amount of fixed charge represented by the movement of wheel 20 may be reduced by subtracting therefrom the movement of the wheel 14. For this purpose the wheels 13, 20 are arranged to rotate in opposite directions. As hereinbefore explained the amount of movement of the wheel 14 may be varied by adjustment of the pin 18. The resultant movement of the planetary cage 15, which represents the fixed charge to be collected, is transmitted to the meter side 32 of the meter differential P, as already explained. The operation of the other parts of the mechanism illustrated in Fig. 1 is well known and need not be further explained herein.

It will be understood that, if the feature of representing a basic definite amount of fixed charge is not desired, the differential D may be omitted and the ratchet wheel 13 may be geared directly to the "fixed charge" side of the summation differential A represented by the sun wheel 23; or, alternatively, the differential D may be retained and have its gear 19 connected to the meter rotor and pinion 28 instead of to the gear 3, in which case the differential A could be omitted and the shaft 8 geared directly to the commodity side of the differential P represented by the sun wheel 32.

Referring now to the second embodiment of the invention illustrated diagrammatically in Fig. 2 a synchronous motor or other constant speed mechanism (not shown) is geared through gearing 40 to a shaft 41 which carries two gear wheels 47, 48 secured thereto. The wheel 47 gears with a wheel 49 which is integral with a sleeve 51 secured to the sun wheel 50 of an epicyclic gear mechanism. The sleeve 51 is loosely mounted on a shaft 42 provided with suitable bearings. Likewise the wheel 48 gears through an idler 61 with a wheel 55 which is integral with a sleeve 57 and the sun wheel 56 of an epicyclic gear mechanism. The sleeve 57 with wheels 55 and 56 is loosely mounted on shaft 42. Each of the planetary wheels 53, 59 of the epicyclic gear mechanisms is adapted to gear with its respective wheel of two wheels 50, 56. The planetary wheel 53 is integral with a smaller wheel 54 which gears with the wheel 43, and the planetary wheel 59 is integral with a smaller wheel 60 which gears with the wheel 44. The wheels 43 and 44 are integral with a hub 45 securely mounted on the shaft 42. The planetary wheels 53, 54 or 59, 60 of each epicyclic gear mechanism are rotatable on a shaft or spindle secured to its respective rotatable disc 52, 58 loosely mounted on the sleeves 51, 57 respectively. The gearing between the gear wheels 47, 48 and the respective sun wheels 50, 56 of the epicyclic gears is such that the directions of rotation of the two sun wheels are in opposite directions. Hence the inclusion of the idler 61 in one of the gear trains. The shaft 42 is provided with a gear wheel 46 secured thereto and is geared through suitable gearing to one sun wheel 77 constituting the fixed charge member of a summational mechanism A, the other sun wheel 78 or consumption member of which is driven from the meter rotor (not shown), the movements of both sun wheels being added by the planetary cage 79 and transmitted to the commodity side of the meter differential P as hereinbefore described in reference to Fig. 1.

The two rotatable discs 52, 58 are adapted to be held alternately by means of a brake device. This device comprises an oscillatory lever 62 pivoted at 80 to a stationary part of the meter frame and having on either side of the pivot two brake shoes or pallets 81, 82. The lever 62 is pulled in one direction (e. g. clockwise) by means of a spring 76 and is held against the action of the spring by means of a catch lever 66 provided at its lower end with a hook 74 adapted to engage a pin 75 projecting from the lever 62. The lever 66 is pivoted at 67 to one arm (the horizontal arm) of a bell crank lever 64 which is pivoted to the meter frame at 65. The lever 66 is adapted to be tripped by a rotatable arm 73 which is rotated by means of the synchronous motor or other constant speed device. For this purpose a wheel 83, secured to a shaft 84 mounted in suitable bearings and having a worm 85 thereon, is provided and the wheel 83 meshes with the wheel 47. The worm 85 meshes with a worm wheel 86 secured to the same shaft as a wheel 87 which meshes with a wheel 88 and to the shaft of which the arm 73 is adjustably secured. The arm 73 is provided with a projecting pin 73a adapted to engage with the end of the lever 66 and thereby rotate the said lever about its pivot 67.

The other or vertical arm of the bell crank lever 64 is adapted to be operated upon by a second rotatable arm 72 provided with a pin 72a which contacts with the end of the said arm of the bell crank lever as it passes thereover and causes the said lever to oscillate about its pivot 65. As the bell crank lever is moved in one direction it depresses the trip arm 66 and is normally pulled in the other direction against a stop 70 by a spring 69. A spring connection 68 between the bell crank lever 64 and the trip arm 66 also pulls the trip arm back to its normal or unoperated position against a stop 71.

It will be understood that the arrangement of the levers 64 and 66 is such that lever 64 is operated only by the pin 72a, and lever 66 is operated only by pin 73a, the pins 73a and 72a pointing in opposite directions and the path of the pins being between the two levers. The mechanism just described gives a snap action movement to the lever 62.

In operation as the arm 73 rotates it rocks the trip arm 66 out of contact with the oscillating lever 62, the position of which is reversed by means of its control spring 76 so that the disc 52 which was formerly held is now released and the other disc 58 is held by the brake shoe 82 contacting therewith. The arm 72 also rotates, but is angularly displaced with respect to the arm 73. When the arm 72 contacts by means of the pin 72a with the bell crank lever 64, this latter is rocked about its pivot 65 and the trip lever 66 thereby depressed. After the pin 72a has passed over the bell crank lever 64 this latter returns to its normal position against the stop 70, under the action of its control spring 69 and in so returning, the trip lever 66 is raised. The hooked end 74 provided on the trip lever hooks the projecting pin 75 on the lever 62 and during the upward movement of the lever 66, the lever 62 is rotated about its pivot 80 (in an anticlockwise direction) against the action of spring 76 and consequently releasing the disc 58 and braking the disc 52.

The angular distance between the two rotatable arms 72 and 73 is adjustable. For this purpose the arm 72 is secured to the shaft of the wheel 88 and the arm 73 is secured to a disc 63, which by means of a screw 63a is adjustably mounted on the end of the shaft of wheel 88. When the arm 73 is to be adjusted, the screw 63a is slackened and the disc 63 is rotated relatively to the shaft. The disc 63 is provided with a series of circumferential marks, which by means of a reference mark on the arm 72 indicate the angular distance between arms 72 and 73, and the marks may be suitably designated to indicate the corresponding amounts of fixed charge which the said relative positions of the arms represent.

The operation of the whole mechanism illustrated in Fig. 2 is as follows: The wheels 49 and 55 are continuously rotated in opposite directions by the synchronous motor or other constant speed device. The mechanism is shown in the drawing set for the maximum fixed charge, assumed to be half a crown or 30 pence per week. Of the two sun wheels 50 and 56, the wheel 56 rotates in the direction which advances the meter differential P in the "off" direction, and the wheel 50 rotates in the opposite direction. Assuming as shown in the drawing that the velocity ratio between shaft 41 and wheel 43 is equal to that between shaft 41 and wheel 44, then when no fixed charge is to be made, the wheels 56, 50 must rotate equal amounts for each revolution of the shaft 41, and it will be observed that for these conditions to exist, assuming the arms to rotate in an anticlockwise direction, the arm 73 must be located behind the arm 72 by half a revolution i. e. 180° less the angle between the positions of the two arms when operating simultaneously upon the respective lever 64 or 66. If the position of the arm 73 with respect to 72 when no fixed charge is made be called the zero position, then as the arm 73 is moved towards arm 72 in the direction of rotation, the angular distance between the zero position and the position taken up by the arm 73 will represent the difference in the fractions of the period during which the discs 52 and 58 are held, and consequently the fixed charge to be made. The angular distance between the zero position of the arm 73 and the maximum or nearest position to the arm 72 which it may take up may be divided into equal fractions, each representing equal increments of fixed charge, as shown on the disc 63, for example. As shown, let it be supposed that the pin 72a has just passed over the lever 64 so that, as hereinbefore described, the disc 52 is braked and the disc 58 is free to rotate. Rotation of the wheel 49 is in an anticlockwise direction as viewed from the left hand side of the drawing, and wheel 50 consequently rotates in an anticlockwise direction. Since, however, disc 52 is held stationary, wheels 53 and 54 are rotated in a clockwise direction and wheel 43 is rotated, and consequently the shaft 42 in an anticlockwise direction. Since the disc 58 is free to move, the movement thereof is the resultant of the movements of wheel 44 and wheel 56 and does not impart any movement at this stage to the shaft 42.

After a time predetermined by the angular distance between the arms 72 and 73 the arm 73 trips lever 66 and the lever 62 is released, as hereinbefore described, resulting in the braking of disc 58 and removing the brake 81 from disc 52. Wheel 56, which rotates in a clockwise direction (looking from the left of Fig. 2) imparts a movement to wheels 59 and 60 in an anticlockwise direction and hence to wheels 44 and 43 in a clockwise direction. Shaft 42 therefore is given a movement in the clockwise direction and the movement of disc 52 is the resultant of the movements of wheels 50 and 43. This alternate braking of the discs 52 and 58 occurs once in each revolution of the arms 72 and 73, which may conveniently be made to make for example one complete revolution per hour by suitable reduction gearing between the shaft 41 and wheel 88. The resultant movement of the shaft 42 per cycle of the arms 72 and 73 is the difference between its movement in the clockwise and anticlockwise directions, and will be, in the example given, in a clockwise direction. The movement of the shaft 42 is transmitted to the meter side of the meter differential P as hereinbefore explained.

In the description with reference to Fig. 2 it has been assumed that the velocity ratio between the shaft 41 and wheel 43 is equal to the velocity ratio between the shaft 41 and wheel 44 and in this, the simplest case, it will be observed the wheels 50 and 56 must rotate in opposite direction. It will, however, be seen that with unequal velocity ratios between the shaft 41 and wheel 43 or 44 respectively, the sun wheels 50 and 56 may be made to rotate in the same or opposite directions, and consequently the wheels 43, 44 will rotate during alternate fractions of a period in the same or opposite directions, giving a summational or differential resultant movement to the shaft 42 and to the meter differential. The available portion of the circumference of the disc 63 for reference marks will depend upon the respective velocity ratios, but in all cases it will be an equally divided scale for equal increments of fixed charge.

I have herein shown and particularly described certain embodiments of my invention and certain methods of operation embraced therein for the purpose of explaining its principle and showing its application, but it will be obvious to those skilled in the art that many modifications and variations are possible, and I aim, therefore, to cover all such modifications and variations as fall within the scope of my invention which is defined in the appended claims.

What I claim as new and desire to secure by Letters Patent of the United States is:

1. A prepayment meter for including an adjustable fixed charge in the prepaid amount collected, said meter comprising a member driven at constant speed, a rotatable member the rotation of which represents the amount of fixed charge, and an intermittently operative connecting device between said constant-speed member and said fixed charge member for transmitting movement of said constant-speed member intermittently to said fixed charge member in successive time periods during only a predetermined fractional part of each period, said device including a pair of engageable elements one of which is carried by said constant speed member, means connecting the other of said engageable elements to said fixed charge member, relatively movable means included in the engageable element carried by the constant speed member for engaging said elements, stationary means in the path of said engaging means for periodically tripping and thereby disengaging said engaging means and means for varying the position of said stationary tripping means, thereby altering the uninterrupted length of time within each time period during which said engageable elements are engaged.

2. A prepayment meter for including an adjustable fixed charge in the prepaid amount collected, said meter comprising a constant-speed device, a differential, two driving connections between said constant-speed device and said differential, means maintaining one or the other of said driving connections continuously in operation to transmit movement of the constant-speed device to said differential, and a device adapted to render effective periodically one of said driving connections not otherwise effective, said latter device including means for rendering said latter mentioned driving connection effective for adjustably variable fractions of the periodic time.

3. In a prepayment meter having a fixed charge member to be rotated in accordance with a fixed charge to be collected, a differential mechanism with a member rotated continuously at uniform speed, a second member adapted to be rotated periodically at uniform speed and means for rotating said fixed charge member in accordance with the net rotation of said other two members, a constant speed driver, a periodically effective connection between said driver and said second member, means for rendering said connection alternately effective and ineffective, and means for varying the fraction of the time during which said connection is effective.

4. In a prepayment meter having a fixed charge member to be rotated in accordance with a fixed charge to be collected, a constant speed device, a train of gears constantly in mesh between said constant speed device and said fixed charge member, said train including a gear having a support for its axis movable transversely to the said axis, a gear meshing with said movable supported gear and a gear having a shaft connected in driven relation with said movable support, an additional gear meshing with said movable supported gear of the gear train, means for connecting said additional gear to said constant speed mechanism periodically for a fraction of said periodic time and means for preventing backward movement of said additional gear.

5. In a prepayment meter having a fixed charge member to be rotated in accordance with a fixed charge to be collected, a constant speed device, a first train of gears between said constant speed device and said fixed charge member, a second train of gears adapted to be brought in operation between said constant speed device and said fixed charge member alternatively to said first train of gears and having a different effect than said first train of gears, and means for bringing said second train of gears into operation periodically for a fraction of the periodic time and simultaneously making said first train of gears ineffective.

6. In a prepayment meter having a fixed charge member to be rotated in accordance with a fixed charge to be collected, a differential with a pair of sun wheels and a cooperating planet wheel, said planet wheel serving to drive said fixed charge member, means for continuously rotating one of said sun wheels at constant speed, means for connecting the other of said sun wheels to said constant speed means, and means for intermittently disconnecting said latter sun wheel from said constant speed means during a fraction of successive periodic times.

7. In a prepayment meter having a fixed charge member to be rotated in accordance with a fixed charge to be collected, a pair of epicyclic gear mechanisms each with driving and driven sun wheels and a rotatably mounted planetary cage carrying planetary wheels meshing with said sun wheels, said driven sun wheels being geared to said fixed charge member, means for rotating said driving sun wheels at constant speed, means for alternately holding said planetary cages stationary, and means for making the lengths of the time periods one cage is held bear a predetermined ratio to the lengths of the time periods the other is held.

8. In a prepayment meter having a fixed charge member to be rotated in accordance with a fixed charge to be collected, a pair of epicyclic gear mechanisms each with driving and driven sun wheels and a rotatably mounted planetary cage carrying planetary wheels meshing with said sun wheels, said driven sun wheels being geared to said fixed charge member, means for rotating said driving sun wheels at constant speed, means for alternately holding said planetary cages stationary, and means for making the lengths of the time periods one cage is held bear a predetermined ratio to the lengths of the time periods the other is held, said latter means including mechanism for adjusting said ratio in accordance with the amount of the fixed charge to be collected.

9. In a prepayment meter for including an adjustable fixed charge in the prepaid amount collected, a constant-speed mechanism, an intermittently rotatable member, a ratchet wheel connected to said member, a rotatable arm carrying a ratchet adapted to cooperate with said ratchet wheel and carrying a projecting pin, a second rotatable arm connected to said constant speed mechanism and carrying a driving pawl adapted to engage said pin, said driving pawl being rotatable on said latter arm and having a heel, an adjustable stop adapted to engage said heel when said latter arm is rotated to a predetermined position to rotate said pawl and cause it to ride off said projecting pin, and means for resiliently restoring said first rotatable arm to an initial position when its pin is disengaged by said pawl, said stop being adjustable in position to cause disengagement of said pawl from said pin after said ratchet has driven said ratchet wheel a predetermined adjustable fraction of a revolution.

NORMAN WRIGHT.